(12) United States Patent
Todd

(10) Patent No.: US 7,065,364 B1
(45) Date of Patent: Jun. 20, 2006

(54) METHOD AND APPARATUS FOR WIRELESS COMMUNICATION

(75) Inventor: Robert Edmund Todd, Northumberland (GB)

(73) Assignee: Cedardell Limited (GB)

( * ) Notice: Subject to any disclaimer, the term of this patent is extended or adjusted under 35 U.S.C. 154(b) by 485 days.

(21) Appl. No.: 10/048,743

(22) PCT Filed: Jul. 19, 2000

(86) PCT No.: PCT/GB00/02774

§ 371 (c)(1),
(2), (4) Date: Jun. 14, 2002

(87) PCT Pub. No.: WO01/15374

PCT Pub. Date: Mar. 1, 2001

(30) Foreign Application Priority Data

Aug. 24, 1999 (GB) ................................. 9919920.0

(51) Int. Cl.
*H04Q 7/20* (2006.01)

(52) U.S. Cl. ................ 455/445; 455/11.1; 455/517; 455/421; 455/7

(58) Field of Classification Search .............. 455/11.1, 455/445, 517, 434, 421, 7, 404.1, 524, 343.3
See application file for complete search history.

(56) References Cited

U.S. PATENT DOCUMENTS

| 3,745,462 | A |   | 7/1973  | Trimble |
| 5,465,081 | A | * | 11/1995 | Todd ......................... 340/10.2 |
| 5,740,363 | A |   | 4/1998  | Siep et al. |
| 5,890,054 | A |   | 3/1999  | Logsdon et al. |
| 6,125,279 | A | * | 9/2000  | Hyziak et al. ............... 455/445 |
| 6,377,805 | B1 | * | 4/2002 | Anvekar et al. ............ 455/436 |

FOREIGN PATENT DOCUMENTS

| EP | 0851632 A2 | 7/1998 |
| WO | WO 98/39936 | 11/1998 |

* cited by examiner

*Primary Examiner*—Lee Nguyen
*Assistant Examiner*—Sanh Phu
(74) *Attorney, Agent, or Firm*—Beyer Weaver & Thomas, LLP

(57) ABSTRACT

A method of transmitting wireless messages in a communications system (201) having a plurality of transceiver units (203) for receiving and onwardly transmitting wireless messages is disclosed. In a first mode of the system, messages are transmitted from a first transmitter to a target receiver by sequential transmission via at least one transceiver unit (203). In a second mode, a wireless message containing information identifying a target receiver is transmitted from a first transmitter. The target receiver transmits an acknowledgement signal in response to receipt of the message, and at least one of the transceiver unit (203) transmits the message if that unit does not detect within a predetermined period the acknowledgement signal or transmission of the message by a predetermined other transceiver unit (203).

15 Claims, 3 Drawing Sheets

METHOD AND APPARATUS FOR WIRELESS COMMUNICATION

The present invention relates to a method and apparatus for wireless communication, and relates particularly, but not exclusively, to a method and apparatus for wireless communication in a security or fire alarm system.

Communication systems comprising a number of communications modules and at least one control module are known in which each communications module is in contact with the control module either directly or indirectly. These systems are particularly useful for communicating messages across a large area by relaying the message between successive communications modules. This enables the system to operate by means of communications modules of relatively low power, which in many countries are subject to less stringent regulations than high power modules, and yet transmit messages across relatively large distances.

An example of such a communication system is shown in FIG. 1. A communications system 1 has a master unit 2 and a plurality of communications units 3. The master unit 2 and communications unit 3 are configured in a loop arrangement by assigning each of the communications units 3 a unique ID number, and assigning the control module 2 two ID numbers, i.e. zero and the number of communications modules 3 in the loop plus one. In the arrangement shown in FIG. 1 with a single control module 2 and five communications modules 3, communication between loop units and the control module 2 takes place by messages travelling around the loop of units 2, 3 in either direction, each communications module 3 relaying the message to its neighbouring unit on the loop.

However, such prior art systems suffer from the drawback that in a large system, because the message is relayed by adjacent communications units 3, each of which receives and transmits the message, a considerable delay in transmitting a message from the control module 2 to its destination can arise. In emergency situations, such as in a security system or fire alarm system, this can clearly have serious consequences.

Preferred embodiments of the present invention seek to overcome the above disadvantages of the prior art.

According to an aspect of the present invention, there is provided a method of transmitting wireless messages in a communications system having a plurality of transceiver units for receiving and onwardly transmitting wireless messages, wherein the system has a first mode, in which messages are transmitted from a first transmitter means to a target receiver means by sequential transmission via at least one said transceiver unit, and a second mode, the method comprising the steps of:

when the system is in said second mode:
  transmitting from a first transmitter means a said wireless message containing information identifying a target receiver means;
  transmitting from said target receiver means an acknowledgement signal in response to receipt of said message by said target receiver means; and
  causing at least one said transceiver unit to transmit said message if the or each said unit does not detect within a respective predetermined period said acknowledgement signal or transmission of said message by a predetermined other transceiver unit.

This provides the advantage that in an alarm condition (i.e. in the second mode of the system), the first transmitter means attempts to transmit a wireless message directly to the target receiver means. If the target receiver means is out of range, no acknowledgement signal is received, and one or more other transceiver units transmits the message until the acknowledgement signal is detected to indicate that the message has been received by the target receiver means, or the or each unit detects that a respective predetermined other unit has transmitted the message. In the case in which the predetermined other unit has a higher probability of successfully transmitting the message to the target receiver means (for example because it is within range of direct communication with the target receiver means), this provides the further advantage that messages can be transmitted by the system more rapidly and more reliably than in the prior art. Furthermore, because the retransmission of the message itself is used as a means of detecting whether the message was successfully received by a particular transceiver unit, the assessment of whether any of a number of possible messages from a number of other units in the system was received is rapid and reliable.

A further advantage of the invention is that the system is "dynamic", i.e. it responds to the particular circumstances and conditions prevailing in the system at the time when any particular message is transmitted. For example, if the first transmitter means cannot transmit a message directly to the target receiver means, the message will be transmitted via a further unit, but a later message may be transmitted directly from the first transmitter means to the target receiver means if conditions permit at that time.

Preferably, said first transmitter means is adapted to transmit messages to said target receiver means in said first mode via said predetermined other transceiver unit.

This provides the advantage that the predetermined other transceiver unit has a higher probability than said first transmitter means of directly transmitting a message to said target receiver means.

Said first transmitter means and/or said target receiver means may be a control unit.

Said first transmitter means and/or said target receiver means may be a said transceiver unit.

In a preferred embodiment, at least one said transceiver unit located adjacent to said target receiver means successively transmits said message until the or each said transceiver unit detects said acknowledgement signal.

This provides the advantage of maximising reliability of the system by one or more transceiver units adjacent to the target receiver means repeatedly transmitting the message until it is received by the target receiver means.

In a preferred embodiment, each said transceiver unit transmits said message after a respective delay depending upon the position of the said transceiver unit relative to the first transmitter means and target receiver means in order of communication in the first mode of the system.

It has been found that the present invention enables messages to be transmitted to a target receiver means in the second mode of the system much more rapidly than in the prior art. For example, if a message takes approximately 50 ms to transmit at each successive transmission by a transceiver unit, by replacing, say, three steps of the first mode (i.e. corresponding to 150 ms) with two delay periods of, say, 2 ms, the speed of communication by the system in its second mode is considerably enhanced.

Preferably, each said delay is shorter the closer the transceiver unit corresponding thereto is to the target receiver means in order of communication in the first mode of the system, and each said transceiver unit transmits said message if no acknowledgement signal or transmission by a transceiver located closer to the target receiver means in order of communication in the first mode of the system is detected within a predetermined period.

The acknowledgement signal may be transmitted to said first transmitter means.

Preferably each said transceiver unit has an identification code representing its order of communication in the first mode of the system.

According to another aspect of the invention, there is provided a communication system comprising a first transmitter means for transmitting a wireless message, and a plurality of transceiver units, each of which is adapted to receive said message from the first transmitter means and/or from another transceiver unit and transmit said message to a further transceiver unit, wherein the system has a first mode, in which messages are transmitted from a first transmitter means to a target receiver means by sequential transmission via at least one said transceiver unit, and a second mode in which a wireless message is to be transmitted to a target receiver means, said target receiver means is adapted to transmit an acknowledgement signal in response to receipt of said message, and at least one said transceiver unit directly receiving said message is adapted to transmit the message if said acknowledgement signal or transmission of said message by a predetermined further transceiver unit is not detected within a respective predetermined period.

In a preferred embodiment, the or each said further transceiver unit is located closer to the target received means in order of communication in the first mode of the system.

The first transmitter means and/or target receiver means may be a control unit.

The first transmitter means and/or target receiver means may be a said transceiver unit.

In a preferred embodiment, at least one said transceiver unit located adjacent to said target receiver means is adapted to successively transmit said message until the or each said transceiver unit detects said acknowledgement signal.

In a preferred embodiment, each said transceiver unit is adapted to transmit said message after a respective delay depending upon the position of the said transceiver unit relative to the first transmitter means and target receiver means in order of communication in the first mode of the system.

Preferably, each said delay is shorter the closer the transceiver unit corresponding thereto is to the target receiver means in order of communication in the first mode of the system, and each said transceiver unit is adapted to transmit said message if no acknowledgement signal or transmission by a transceiver located closer to the target receiver means in order of communication in the first mode of the system is detected within a predetermined period.

Preferably each said transceiver unit has an identification code representing its location within the system in order of communication in the first mode of the system.

As an aid to understanding the invention, a preferred embodiment thereof will now be described, by way of example, only and not in any limitative sense, with reference to the accompanying drawings, in which.

Figure 1:
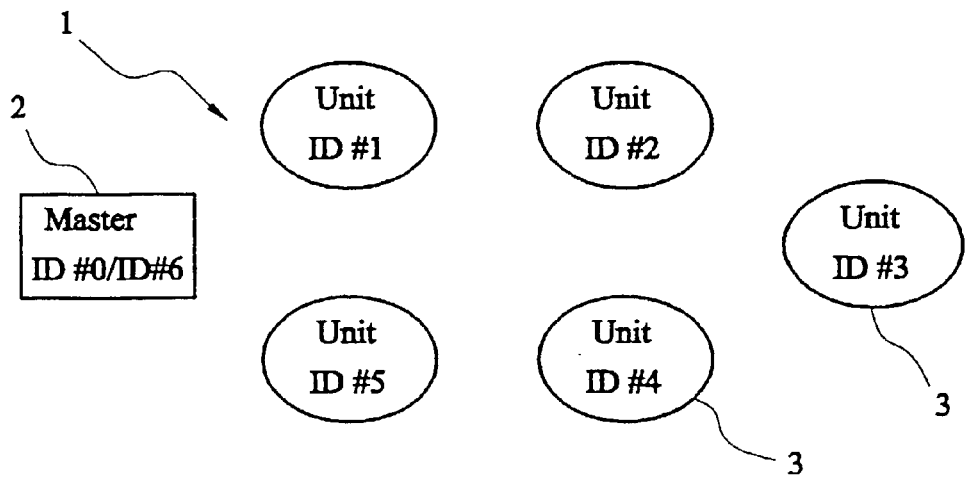
FIG. 1 is a schematic representation of a prior art communication system.
Figure 2:
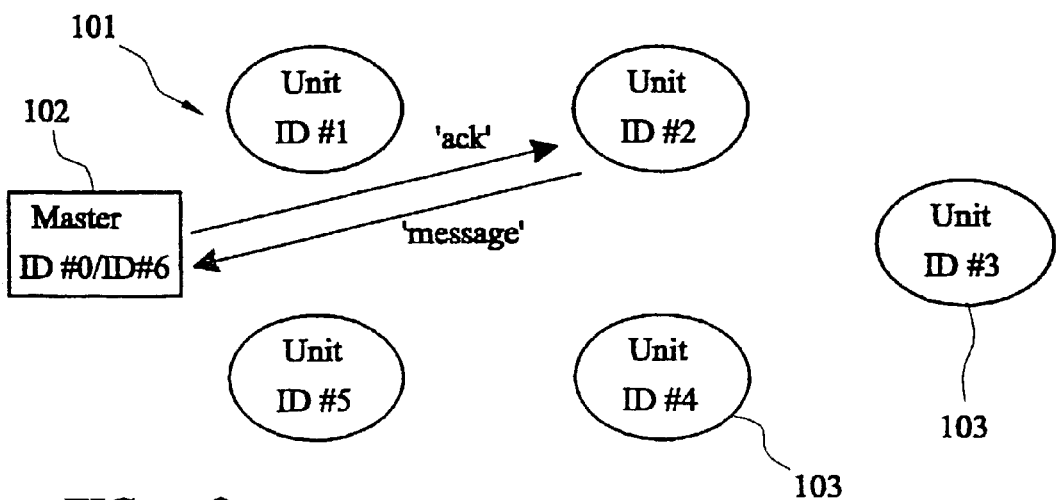
FIG. 2 is a schematic representation of a communication system of a first embodiment of the present invention in which a control unit communicates directly with a target transceiver unit.

Referring in detail to FIG. 2, a communications system 101 includes a control unit 102 and a plurality of transceiver units 103 arranged in a loop, each transceiver unit 103 being allocated a unique identification number. In the example shown, five transceiver units are present, and are numbered #1, #2, #3, #4 and #5 respectively. When the control unit 102 transmits a message which is intended to be received by all loop units, or by a group of loop units, in a first mode of the system, the message is sent around the loop in the conventional manner, i.e. from control unit 102 to transceiver unit #1 103, from transceiver unit #1 103 to transceiver unit #2 103, and so on.

In an alarm condition of the system 101, i.e. in a second mode of the system, in which, for example, transceiver unit #2 103 is to transmit a wireless message to the control unit 102 as quickly as possible, the message shows the identity of the transceiver unit 103 which transmitted the message, and the control unit 102, which is the intended destination of the message. If the control unit 102 directly receives the message on the first transmission, it processes the message and transmits an acknowledgement signal in response. The other transceiver units 103 detect the acknowledgement signal from the control unit 102 and as a result do not attempt to relay the message to the control unit 102.

Figure 3:
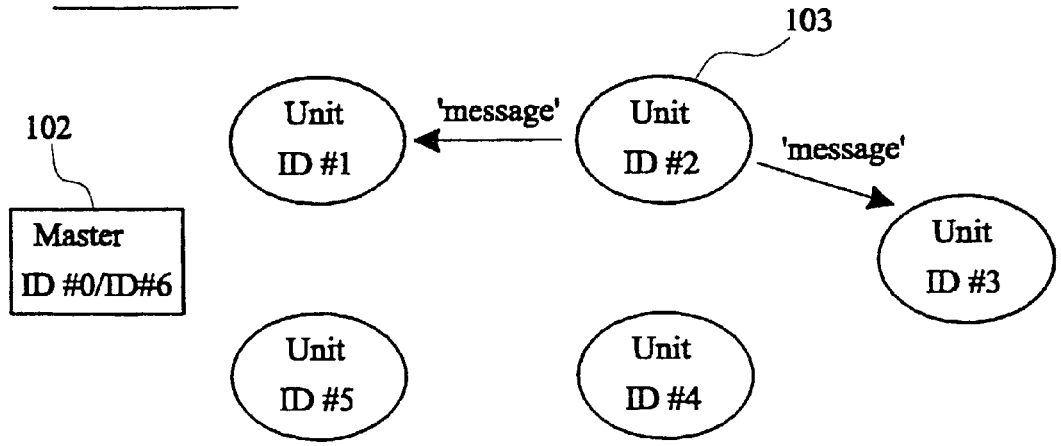
FIGS. 3 and 4 are schematic representations of the communication system of FIG. 2, but in which a transceiver unit communicates indirectly with the control unit.

Referring now to FIG. 3, in the case in which transceiver unit #2 103 attempts to transmit a message directly to the control unit 102, if the control unit 102 does not receive the message in the first transmission, no acknowledgement signal is generated by the control unit 102. However, the message is detected by transceiver units #1 and #3 103, and since the transceiver unit #1 103 does not detect an acknowledgement signal from the control unit 102 and has a lower ID number than that of the transceiver unit 103 from which the message originates, transceiver unit #1 attempts to relay the message because it is closer in order of communication to the control unit 102, the intended destination of the message.

It will be appreciated by persons skilled in the art that the order of communication of the devices within the system will be determined by a number of factors, including the physical location of the devices, as well as a number of other ambient influences. As ambient conditions change, the system may re-sequence the order of communication of the devices in order to optimise reliability of communication throughout the system. In general, however, the order of communication will be determined by the probability that a particular device will successfully communication with the device next in order in the system.

Transceiver unit #3 103, because it has a higher ID number than that of transceiver unit #2, is further away than transceiver unit #2 from the control unit 102 in order of communication around the system and therefore does not attempt co transmit the message. On receipt of the message, the control unit 102 issues an acknowledgement signal which is relayed back to transceiver unit #2 103, either directly or indirectly.

Figure 4:
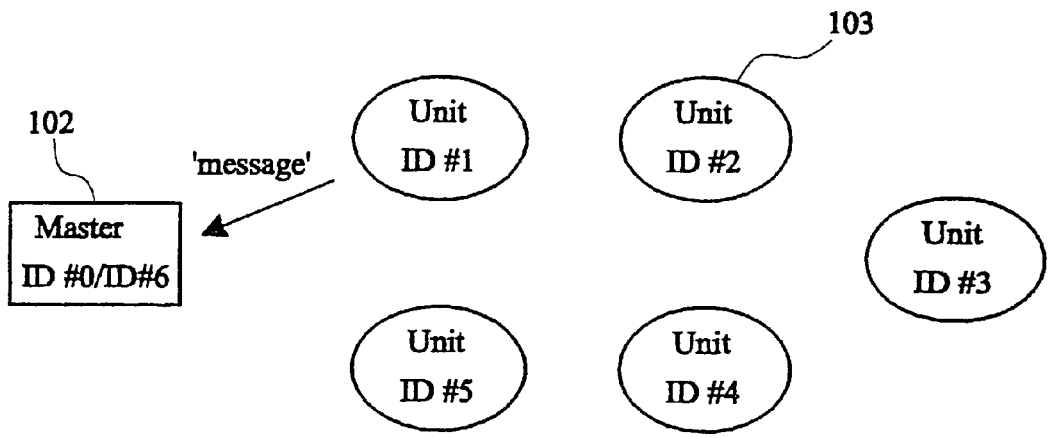
Figure 5:
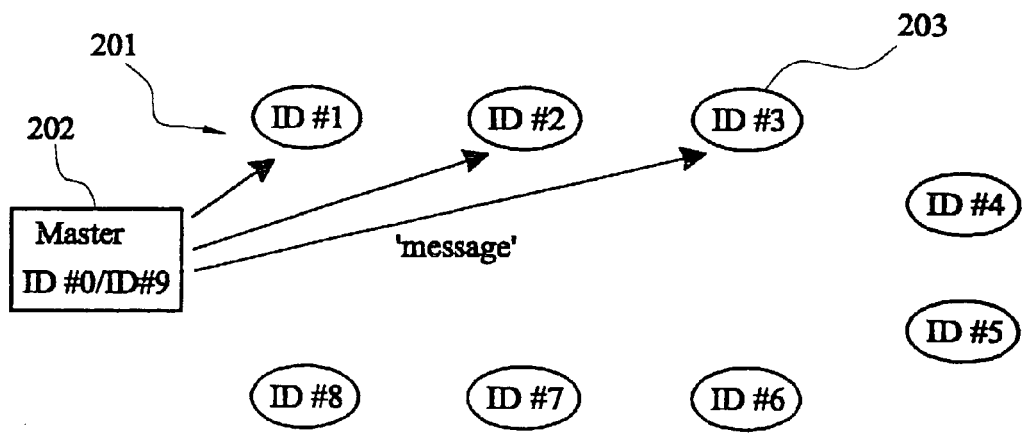
FIGS. 5 and 6 are schematic representations of a communications system of a second embodiment of the present invention.

Referring to FIG. 5, in which parts common to the embodiment of FIGS. 2 to 4 are denoted by like reference numerals but increased by 100, a control unit 202 of a communication system 201 is attempting to transmit a message to transceiver unit #5 203 in an alarm condition.

Transceiver unit #5 203 is out of range of direct communication with the control unit 202, but transceiver units #1, #2, #3 203 receive the message.

Figure 7:
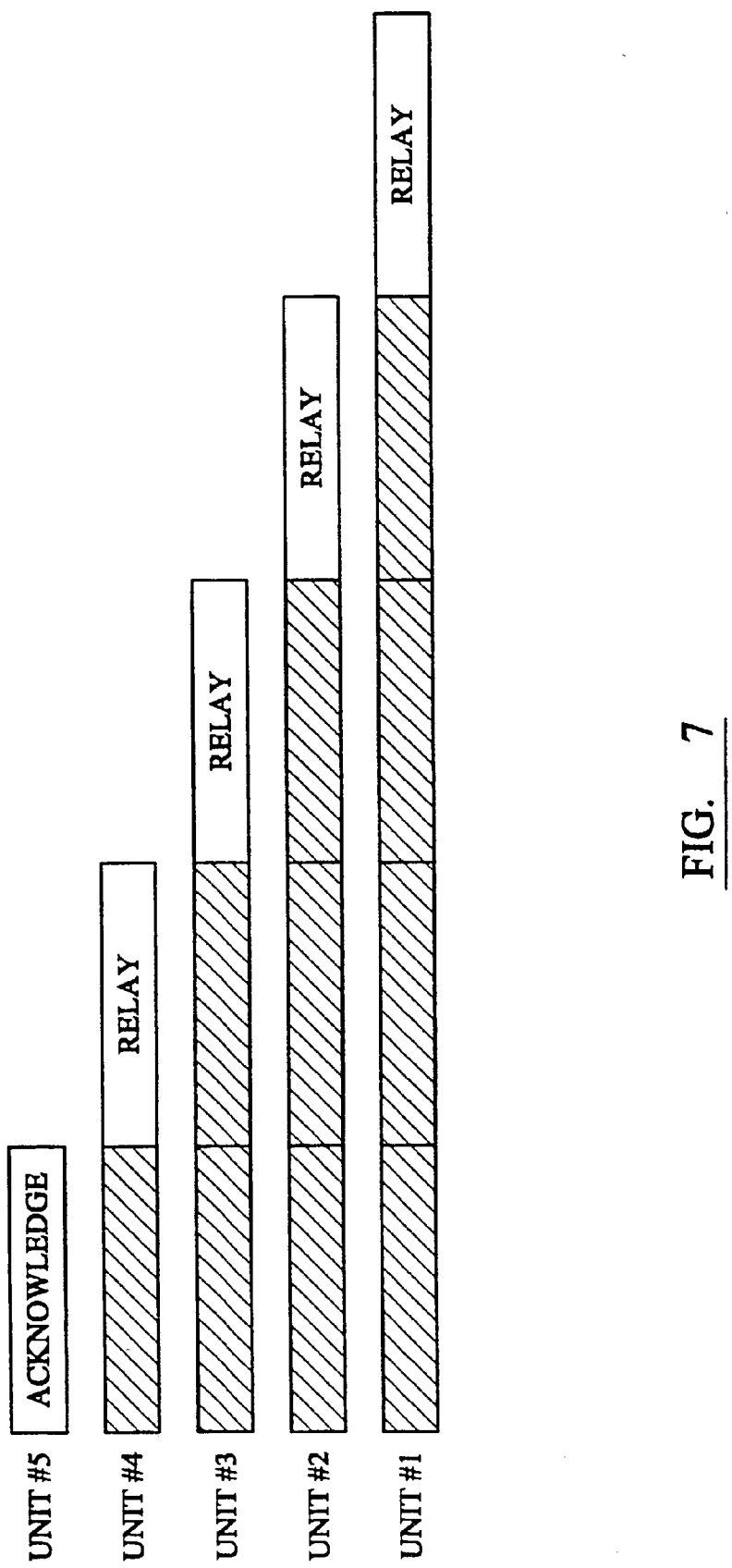
FIG. 7 is a timing diagram illustrating the operation of the communications system of FIGS. 5 and 6.

On receipt of the message, transceiver unit #3 calculates a delay period based on its unique ID number and the ID number of the destination unit #5, and then monitors radio traffic for that delay period. In particular, referring to FIG. 7, the delay times in the case in which transceiver unit #5 is the intended destination of the message are calculated in such a way that transceiver unit #5 203 transmits an acknowledgement signal during a first period following receipt of the message by transceiver unit #5. The next closest unit #4 has a delay period corresponding to the period during which the acknowledgement signal 250 should be transmitted by unit #5, and then relays the message 251 during a time period following the delay if it does not detect the acknowledgement signal 250. Similarly, the unit #3 has a delay corresponding to the sum of the periods in which the acknowledgement signal 250 would be transmitted by unit #5 and the relay signal 251 would be transmitted by unit #4, and then transmits a relayed signal 252 in a period following that delay. In the same way, it can be seen that units #2 and #1 have delays such that they monitor radio traffic to determine whether any of the units #3, #4 or #5 have transmitted the relevant signals before relaying the message.

In the present case, therefore, since transceiver unit #3 has received the message and does not detect either an acknowledgement signal 250 from unit #5 or another unit 203 relaying the message (since, in the delay time allocated to unit #3, a relayed message 251 transmitted by only unit #4 would be detected, and that message was not transmitted), it then relays the message 252 itself. Units #2 and #1 detect the relayed message 252 transmitted by unit #3, and as a result abandon their own attempts to relay the message. The delay periods therefore ensure that the unit 203 closest in order of communication to the destination unit relays the message first and other units do not attempt to relay the message again.

Figure 6:
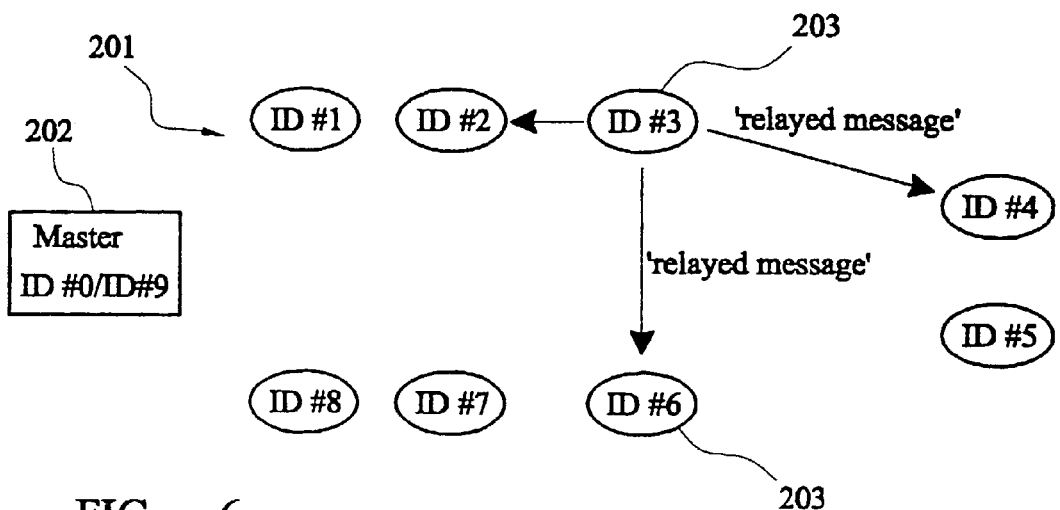

Referring now to FIG. 6, before transmitting the relayed message 252, transceiver unit #3 changes the information in the message to indicate that unit #3 relayed the message. FIG. 6 shows a situation in which unit #5 still does not receive the message, but units #4, #6 and #2 receive the message. Unit #2 detects the relayed message 252 from unit #3 and that unit #5 is the destination unit, and therefore does not attempt to relay the message. Unit #4 detects non-receipt of the message by unit #5 since it does not detect any acknowledgement signal 250, and therefore unit #4 relays the message 251. Since unit #4 is the closest unit to unit #5, the message should be successfully received by unit #5. Finally, unit #6 does not attempt to relay the message because "forwards flow" is being used in this embodiment (i.e. messages are relayed around the loop in the clockwise direction only). However, it will be appreciated by persons skilled in the art that reverse flow is also possible.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A method of transmitting wireless messages in a communications system having a plurality of transceiver units for receiving and onwardly transmitting wireless messages, wherein the system has a first mode, in which messages are transmitted from a first transmitter means to a target receiver means by sequential transmission via at least one said transceiver unit, and a second mode, the method comprising the steps of;

when the system is in said second mode;

transmitting from a first transmitter means a said wireless message contain information identifying a target receiver means;

transmitting from said target receiver means an acknowledgement signal in response to receipt of said message by said target receiver means; and causing at least one said transceiver unit to transmit said message if said transceiver unit or each said transceiver unit does not detect within a respective predetermined period said acknowledgement signal or transmission of said message by a predetermined other transceiver unit, wherein each said transceiver unit transmits said message after a respective delay depending upon the position of the said transceiver unit relative to the first transmitter means and target receiver means in order to communication in the first mode of the system.

2. A method according to claim 1, wherein said first transmitter means is adapted to transmit messages to said target receiver means in said first mode via said predetermined other transceiver unit.

3. A method according to claim 1, wherein said first transmitter means and/or said target receiver means is a control unit.

4. A method according to claim 1, wherein said first transmitter means and/or said target receiver means is a said transceiver unit.

5. A method according to claim 1, wherein at least one said transceiver unit located adjacent to said target receiver means successively transmits said message until the or each said transceiver unit detects said acknowledgement signal.

6. A method according to claim 1, wherein each said delay is shorter the closer the transceiver unit corresponding thereto is to the target receiver means in order of communication in the first mode off the system, and each said transceiver unit transmits said message if no acknowledgement signal or transmission by a transceiver located closer to the target receiver means in order of communication in the first mode of the system is detected within a predetermined period.

7. A method according to claim 1, wherein the acknowledgement signal is transmitted to said first transmitter means.

8. A method according to claim 1, wherein each said transceiver unit has an identification code representing its order of communication in the first mode of the system.

9. A communication system comprising a first transmitter means for transmitting a wireless message, and a plurality of transceiver units, each of which is adapted to receive said message from the first transmitter means and/or from another transceiver unit and transmit said message to a further transceiver unit, wherein the system has a first mode, in which messages are transmitted from a first transmitter means to a target receiver means by sequential transmission via at least one said transceiver unit, and a second mode in which a wireless message is to be transmitted to a target receiver means, said target receiver means is adapted to transmit an acknowledgement signal in response to receipt of said message, and at least one said transceiver unit directly receiving said message is adapted to transmit the message if said acknowledgement signal or transmission of said message by a predetermined further transceiver unit is not detected within a respective predetermined period, where each said transceiver unit transmits said message after a respective delay depending upon the position of the said transceiver unit relative to the first transmitter means and target receiver means in order of communication in the first mode of the system.

10. A system according to claim 9, wherein the or each said further transceiver unit is located closer to the target received means in order of communication in the first mode of the system.

11. A system according to claim 9, wherein the first transmitter means and/or target receiver means is a control unit.

12. A system according to claim 9, wherein the first transmitter means and/or target receiver means is a said transceiver unit.

13. A system according to claim 9, wherein at least one said transceiver unit located adjacent to said target receiver means is adapted to successively transmit said message until the or each said transceiver unit detects said acknowledgement signal.

14. A system according to claim 9, wherein each said delay is shorter the closer the transceiver unit corresponding thereto is to the target receiver means in order of communication in the first mode of the system, and each said transceiver unit is adapted to transmit said message if no acknowledgement signal or transmission by a transceiver located closer to the target recover means in order of communication in the first mode of the system is detected within a predetermined period.

15. A system according to claim 9, wherein each said transceiver unit has an identification code representing its location within the system in order of communication in the first mode of the system.

* * * * *